Feb. 11, 1969  J. C. JUREIT ET AL  3,427,055
CORNER JOINT AND CONNECTOR PLATE THEREFOR
Filed May 31, 1967
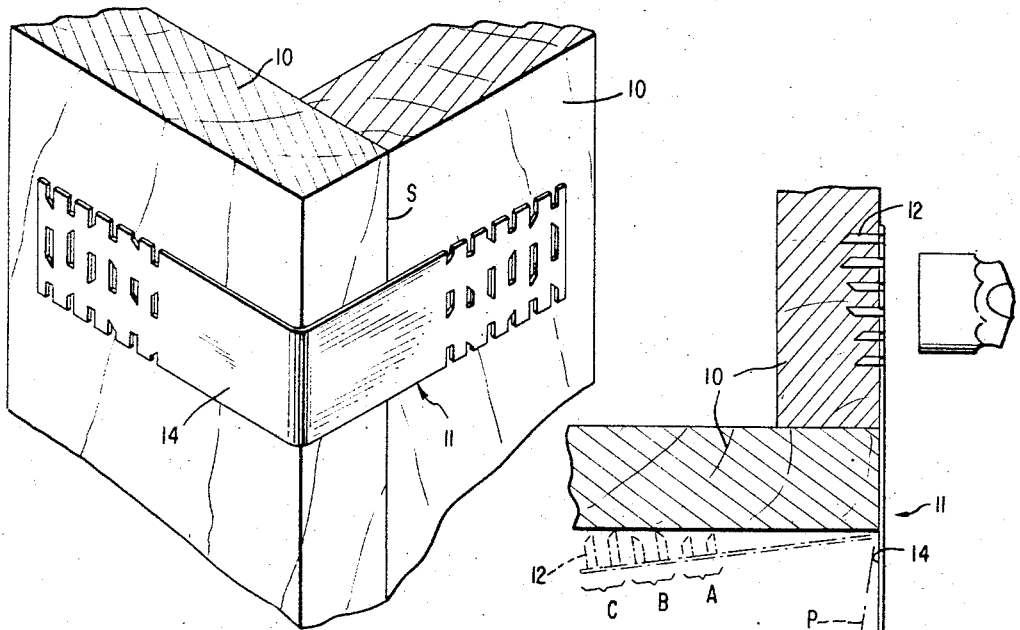
FIG.1
FIG.2
FIG.3
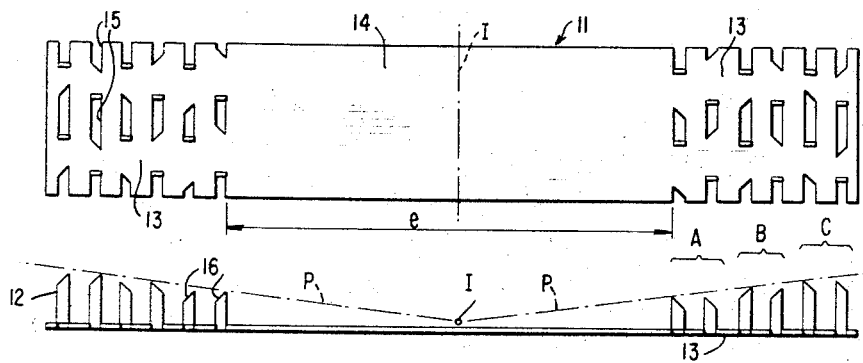
FIG.4
INVENTORS
JOHN C. JUREIT
GILBERT T. COOVERT
BY *LeBlanc & Shur*
ATTORNEYS 3,427,055
CORNER JOINT AND CONNECTOR PLATE
THEREFOR
John Calvin Jureit, Coral Gables, and Gilbert T. Coovert, Hollywood, Fla., assignors to Automated Building Components, Inc., Miami, Fla., a corporation of Florida
Filed May 31, 1967, Ser. No. 642,479
U.S. Cl. 287—20.92        10 Claims
Int. Cl. E04c *3/00;* F16b *7/22, 15/06, 5/06*

ABSTRACT OF THE DISCLOSURE

The corner connector plate has a plurality of integrally projecting, nail-like teeth struck from its opposite ends in transverse rows leaving a planar intermediate portion having a length sufficient to span at least three times the thickness of the wood forming the corner joint. The teeth are struck from each end portion such that adjacent pairs of transverse rows thereof progressively decrease in length from the base of the plate from the outermost pair of rows to the innermost pair of rows, whereby planes lying on the tips of the innermost row of teeth of each pair of rows intersect adjacent the intermediate portion of the plate.

Background of the invention

This invention relates to metallic corner connector plates and more particularly to utility corner plates having integral nails or teeth struck therefrom for joining and reinforcing the corner joints of crates, boxes, pallets or other angularly related surfaces.

Sheet metal connector plates of the type having teeth struck therefrom for forming utility joints joining wooden framing members, particularly corner joints, are known. Conventional connector plates of this type usually have teeth struck therefrom to project at right angles thereto, all of the teeth being identical or substantially identical in length. With a plate thus formed bent to form a corner joint, it is not readily feasible to drive the teeth into the corner faces of the angularly related surfaces either simultaneously or separately without distorting the teeth or causing the metal to bulge outwardly from the corner adjacent the fold line of the plate. In either case and apart from the difficulties in embedding nails of this type of plate into the corner faces, the plate per se is structurally stressed when thus applied to the joint and is thereby weakened.

While these conventional connector plates have been in existence for some time, industry has not adopted plates of this type for general usage and current practice in assembling furniture cartons, crates and the like provides for metal bands which are hand-nailed about the corner joints. These metal bands are often broken in shipment and present sharp projections which protrude from the boxes and, apart from the absence of a secure joint, make handling of the cartons, boxes, crates and the like difficult, if not to a certain extent dangerous.

A solution to these problems has been proposed and is described and illustrated in my U.S. Patent No. 3,305,-252. Notwithstanding the advantages inherent in the connector plate disclosed in such patent, the application of such connectors to a corner structural or utility joint required prior knowledge of the angular relation between the adjoining wooden members, as well as requiring the embedment of the plate as a unit into the corner joint members. For example, to provide a connector plate for a 90° joint, as is illustrated in my aforementioned patent, the teeth at opposite ends of the plate must be struck to an oppositely opening angle of 45° from the plane of the plate and the latter must be prebent about an intermediate fold line to provide the 90° joint angle such that the teeth at both plate ends are parallel to each other. For adjoining surfaces which are otherwise angularly related, the teeth must be struck to a predetermined angle and the plate bent about its fold line to another predetermined angle for each of the differently angled corner joints. This solution, while an advance over the then prior art, necessitated the costly manufacture of a family of connector plates, one for each desired joint angle, and required the driving of the plate into the joint as a unit in contradistinction to the much simpler and more readily accomplished method of driving either end of the plate into either corner face and then driving the other end of the plate into the other angularly related corner face.

Summary of the invention

The present invention provides a connector plate for joining the angularly related wooden framing members, such as the corners of utility boxes, crates, pallets or the like, without regard to the particular angular relationship of adjoining members and which precludes bending, bulging, stressing or otherwise distorting the connector plate in applying the same to the corner joint. In accordance with the present invention, opposite ends of a flat metal plate are struck to provide a plurality of elongated, slender, nail-like teeth which depend from the plate at right angles thereto and which define an intermediate planar plate portion therebetween. The teeth are struck such that, in general, the teeth at each end portion progressively decrease in length from the base of the plate from the outermost end teeth to the innermost teeth adjacent the intermediate plate portion, whereby planes lying on the tips of the teeth would intersect medially of and closely adjacent to the planar intermediate portion in a straight line parallel to the latter. With this plate configuration, either end of the plate may first be secured to one face of the corner joint by hammering or otherwise embedding the teeth thereof into the one face, the other end of the plate being secured by bending the plate about the corner and embedding its associated teeth into the other joint face. In this manner, the tips of the different length teeth on the last secured end of the plate prior to the embedment thereof into the other face will lie substantially parallel with such other face, thereby precluding bulging of the plate or distortion of the first driven teeth on the opposite end of the plate as the latter is finally secured.

Accordingly, it is a primary object of the present invention to provide an improved metal corner connector plate having a plurality of nail-like teeth struck therefrom which can be applied to a pair of angularly related wooden members without distorting or otherwise adversely stressing the plate or the teeth.

It is another object of the present invention to provide an improved metal corner connector plate having a plurality of nail-like teeth struck therefrom which can be applied to angularly related wooden members without regard to the specific angular orientation of the corner surfaces thereof.

It is still another object of the present invention to provide an improved metal corner connector plate having a plurality of nail-like teeth struck therefrom which can be inexpensively manufactured, easily, readily, and rapidly applied to angularly related wooden surfaces, and has maximum holding power for a given quantity of steel.

It is a further object of the present invention to provide a strong, substantially rigid corner joint for utility cartons, crates or the like.

The foregoing and other objects and advantages of the invention will become more apparent upon reference to the following specification, claims and drawings, in which:

*Description of the drawings*

FIGURE 1 is a fragmentary perspective view of a pair of angularly related woden surfaces forming a corner joint, the surfaces being secured together by a corner connector plate constructed in accordance with the present invention;

FIGURE 2 is a fragmentary end view thereof showing the application of the connector plate to the joint;

FIGURE 3 is a top plan view of the connector plate; and

FIGURE 4 is a side elevational view thereof.

*Description of the preferred embodiment*

There is shown in FIGURES 1 and 2 a pair of angularly related wooden members 10 forming a corner joint, the members 10 being secured together by a corner connector plate or bracket generally designated 11. Wooden members 10 may be of any of the wooden frame members of crates, boxes, pallets or the like, or sheathing thereof which may form angularly related surfaces with a frame member, and, in this instance, are illustrated as forming a corner joint having angularly related surfaces of 90°. It will be understood, however, that the corner connector plate of the present invention may be utilized with other wooden structural members forming corner joints otherwise angularly related and otherwise abutting.

As best seen in FIGURES 3 and 4, connector plate 11 comprises a flat rectangular plate, preferably formed of 20 gauge sheet metal such as galvanized mild steel, although sheet metal of heavier gauge can be utilized. The plate has two groups of slender, elongated, nail-like teeth 12 struck from opposite end portions 13 thereof. The groups of teeth 12 are struck such as to leave a flat intermediate plate portion 14 spaced therebetween which has a length $e$ sufficient to span preferably no less than three times the thickness of the wood forming the corner edges of the joint. For example, for boxes, crates or the like having corner wooden structural members having a thickness of ¾″, the length $e$ should be at least 2½″ and preferably longer as to insure that the teeth at one plate end are not embedded in the same wooden corner member as the teeth at the other end of the plate or in the joint seam indicated s formed between the structural members.

The teeth 12 of each end group are struck to project integrally from the same side of and substantially normal to plate 11 as to leave narrow, transversely extending slots 15 through end portions 13 whereby the bend axes of teeth 12 extend longitudinally of plate 11. In this manner, none of the teeth 12 are structurally weakened in the direction of loading. Slots 15 are arranged in spaced, side-by-side relation in a plurality of longitudinally extending rows and in spaced end-to-end relation in a plurality of transversely extending rows. Teeth 12 are struck in each end group so that adjacent slots left thereby in each longitudinally extending row extend from the teeth in opposite transverse directions whereby the teeth 12 formed from each longitudinal row of slots 15 extend longitudinally of plate 11 in staggered rows. Additionally, teeth 12 are struck as to extend from the same ends of slots 15 left thereby in each transverse row, the teeth struck from adjacent transverse rows extending from the opposite ends of adjacent slots 15. Teeth 12 are thus optimally spaced to provide high tooth density and consequent maximum holding power for a given quantity of sheet metal. Four longitudinal rows of teeth 12 are illustrated in each group thereof and it will be understood that a larger number of rows thereof could be formed and fewer rows than at least three would not optimally prevent buckling or twisting.

It is a significant feature of the present invention that the corner plates hereof can be applied to a pair of angularly related surfaces without distortion or otherwise adversely stressing the plate or teeth and without bulging or otherwise spacing the sheet metal forming the corner bend in the plate outwardly of the wooden corner members when the plate is finally secured. To this end and as best seen in FIGURE 4, the teeth 12 are struck from each end plate portion 13 such that the length of teeth in adjacent pairs of transversely extending rows thereof become progressively shorter toward intermediate plate portion 14. In other words, the teeth forming the innermost pair of transverse rows, designated A, are shorter in length than the teeth forming the outermost pair of transverse rows thereof, designated C, the middle pair of rows of teeth, designated B, being intermediate in length to the length of the teeth in rows A and C. In this manner, planes, designated P, lying on the tips of the teeth 12 forming the innermost row of each pair of transverse rows intersect in a line I which lines parallel to the plate 11 medially of intermediate portion 14. In the illustrated form, line I is spaced from but very closely adjacent to plate 11 and it has been found that, while the teeth 12 can be struck to lengths whereby planes P intersect in intermediate portion 14, a more effective joint and substantially distortion free connection can be made in practice with teeth lengths formed such that line I is spaced from the plate substantially as shown in FIGURE 4. Moreover, this compensates for the thickness of the metal and the slight distortion of the plate when the corner bend is formed.

The illustrated embodiment shows adjacent pairs of transverse rows being stepped in length and this configuration has been found to provide maximum holding power for a given quantity of steel plate, particularly in harder woods where it is desirable that the teeth enter the wood in sequence and not simultaneously. However, it will be appreciated that adjacent teeth could be formed to progressively increase in length inwardly from opposite ends of the plate without providing the stepped paired transverse row arrangement illustrated and without departing from the scope of the present invention. It will also be noted that if the tips of the stepped transverse rows of teeth are scarfed as at 16 in opposite directions whereby a clenching action takes place on embedment of the teeth in the wood, thus providing for maximum holding power.

To apply connector plate 11 to the corner faces of structural members 10 to form a joint, the plate 11 is positioned such that intermediate portion 14 overlies the seam S and a medial portion of the plate overlies the corner of the joint. The teeth 12 and one end portion 13 are then driven by a hammer or otherwise embedded into the corner face of one of members 10 in the manner illustrated in FIGURE 2. Plate 11 is then bent about the corner end and, as seen in the dashed configuration, the tips of the teeth of the innermost transverse row of adjacent pairs of rows of teeth of the other end group of teeth are substantially simultaneously placed in contact with the other face of member 10 while the base of plate 11 forms an acute angle therewith.

Thus, the initial points of contact and initial points of embedment of the teeth on the face of member 12 is extremely close to the positions of the head portions of the teeth on the surface of member 10 when finally embedded, the latter positions being located by the intersections with the surface 10 of arcs of circles having radii from the corner bend to the head portions. By providing progressively shortened teeth inwardly toward the intermediate portion 14, the angle of entry of the teeth into the surface of member 10 is very nearly normal thereto. Thus, it can be seen that the latter group of teeth can then be embedded into the other face of member 10 substantially without stressing or distorting themselves or the teeth of the first embedded group or without forming a bulge of sheet metal at the corner of the joint.

Note that after the initial embedment of the innermost transverse row of teeth of each adjacent pair of rows of teeth, the outermost transverse row of teeth of such adjacent pairs of rows thereof are also substantially simultaneously placed in contact with the face of member 10. Thus, a stronger joint can be formed with the embedment of such additional teeth, again without stressing or distorting these additional teeth or the already embedded teeth.

The invention can be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A corner connector plate comprising an elongated flat metal plate having a plurality of transverse rows of nail-like teeth struck integral from only one side thereof at opposite end portions thereof, the flat intermediate portion of said plate between said teeth being adapted for bending in conformance with the angular relation of adjacent surfaces of the corner intersection of two planes, the longitudinal extent of said intermediate portion being at least as great as that of one of the toothed portions, said rows of teeth being longitudinally spaced along said end plate portions and being struck therefrom such that teeth in the row in at least one said end portion disposed most adjacent said intermediate portion are shorter in length than teeth in at least one row in said one end portion more remotely spaced from said intermediate portion.

2. A corner connector plate according to claim 1 wherein each pair of said transverse rows of teeth is shorter in length than their next adjacent outermost pair of rows of teeth.

3. A corner connector plate according to claim 2 wherein the tips of the teeth in adjacent pairs of said transverse rows are oppositely scarfed.

4. A corner connector plate according to claim 1 wherein the teeth in said other end portion disposed more nearly adjacent said intermediate portion are shorter in length than teeth in said other end portion more remotely spaced from said intermediate portion whereby planes lying on the tips of said teeth intersect in a line paralleling said plate and closer to said intermediate portion than the shortest of said teeth.

5. A corner connector plate according to claim 4 wherein each pair of said transverse rows of teeth is shorter in length than their next adjacent outermost pair of rows of teeth.

6. A corner connector plate according to claim 5 wherein the tips of the teeth in adjacent pairs of said transverse rows in each said end portion are oppositely scarfed.

7. A pair of angularly related wooden members forming a corner joint, a corner connector plate comprising an elongated flat metal plate having a plurality of transverse rows of nail-like teeth struck integral from only one side thereof at opposite end portions thereof and fully embedded in said wooden members, the flat intermediate portion of said plate between said teeth being bent into conformance with the angular relation of the wooden members, the longitudinal extent of said intermediate portion being at least three times the thickness of said wooden members, said teeth being longitudinally spaced along said end plate portions and being struck therefrom such that teeth in the row in at least one said end portion disposed most adjacent said intermediate portion are shorter in length than teeth in at least one row in said one portion more remotely spaced from said intermediate portion.

8. A corner connector plate according to claim 7 wherein each pair of said transverse rows of teeth being shorter in length than their next adjacent outermost pair of rows of teeth.

9. A pair of angularly related wooden members forming a corner joint, a corner connector plate comprising an elongated flat metal plate having a plurality of transverse rows of nail-like teeth struck integral from only one side thereof at opposite end portions thereof and fully embedded in said wooden members, the flat intermediate portion of said plate between said teeth being bent into conformance with the anglular relation of the wooden members, the longitudinal extent of said intermediate portion being at least three times the thickness of said wooden members, said teeth being longitudinally spaced along said end plate portions and being struck therefrom such that teeth in the row in at least one said end portion disposed most adjacent said intermediate portion are shorter in length than teeth in at least one row in said one portion more remotely spaced from said intermediate portion, the teeth in said other end portion disposed most adjacent said intermediate portion being shorter in length than teeth in said other end portion most remotely spaced from said intermediate portion whereby planes lying on the tips of said teeth intersect in a line paralleling said plate and closer to said intermediate portion than the shortest of said teeth.

10. A pair of angularly related wooden members forming a corner joint, a corner connector plate comprising an elongated flat metal plate having a plurality of transverse rows of nail-like teeth struck integral from only one side thereof at opposite end portions thereof and fully embedded in said wooden members, the flat intermediate portion of said plate between said teeth being bent into conformance with the angular relation of the wooden members, the longitudinal extent of said intermediate portion being at least three times the thickness of said wooden members, said teeth being longitudinally spaced along said end plate portions and being struck therefrom such that teeth in the row in at least one said end portion disposed most adjacent said intermediate portion are shorter in length than teeth in at least one row in said one portion more remotely spaced from said intermediate portion, each pair of said transverse rows of teeth being shorter in length than their next adjacent outermost pair of rows of teeth whereby planes lying on the tips of the teeth forming the innermost row of each said transverse rows thereof intersect in a line paralleling said plate and closer to said intermediate portion than the shortest of said teeth, the tips of the teeth in adjacent pairs of said transverse rows in each said end portions being oppositely scarfed.

References Cited

UNITED STATES PATENTS

| | | | |
|---|---|---|---|
| 483,040 | 9/1892 | Binet | 85—13 |
| 772,149 | 10/1904 | Hunt. | |
| 826,125 | 7/1906 | Steinmetz. | |
| 3,298,151 | 1/1967 | Jureit. | |

CARL W. TOMLIN, *Primary Examiner.*

RAMON S. BRITTS, *Assistant Examiner.*

U.S. Cl. X.R.

85—13